(12) United States Patent
Meyers et al.

(10) Patent No.: US 7,526,473 B2
(45) Date of Patent: Apr. 28, 2009

(54) TRAVERSING A RELATIONAL MODEL WITH PREFERRED PATHS

(75) Inventors: Aaron S. Meyers, Provo, UT (US); Christopher Alan Hays, Monroe, WA (US); Jason D. Carlson, Redmond, WA (US); Robert Alan Meyers, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 132 days.

(21) Appl. No.: 11/158,242

(22) Filed: Jun. 21, 2005

(65) Prior Publication Data

US 2006/0287981 A1 Dec. 21, 2006

(51) Int. Cl.
*G06F 7/00* (2006.01)
(52) U.S. Cl. .............................................. 707/3; 707/2
(58) Field of Classification Search ............... 707/2–6, 707/100, 102; 706/6; 713/193
See application file for complete search history.

(56) References Cited

U.S. PATENT DOCUMENTS

| | | | |
|---|---|---|---|
| 5,875,446 A * | 2/1999 | Brown et al. .................... | 707/3 |
| 6,327,586 B1 * | 12/2001 | Kisiel ............................. | 707/2 |
| 6,847,962 B1 * | 1/2005 | Cochrane et al. ................ | 707/4 |
| 7,228,312 B2 * | 6/2007 | Chaudhuri et al. ........... | 707/102 |
| 7,275,051 B2 * | 9/2007 | Hrle ................................ | 707/2 |
| 2003/0225761 A1 * | 12/2003 | Wagener et al. ................. | 707/6 |
| 2004/0049510 A1 * | 3/2004 | Minch et al. ................. | 707/100 |
| 2004/0193585 A1 * | 9/2004 | Tago ............................. | 707/3 |
| 2005/0039033 A1 * | 2/2005 | Meyers et al. ............... | 713/193 |
| 2005/0278308 A1 * | 12/2005 | Barstow ......................... | 707/3 |

\* cited by examiner

*Primary Examiner*—Hung T Vy
(74) *Attorney, Agent, or Firm*—Woodcock Washburn LLP

(57) ABSTRACT

A preferred path between two selected entities is determined. Initially, there is provided a representation of the data structure in the form of a plurality of entities having relations between them indicative of roles and the relations reflecting a cardinality of one of a one-to-one, one-to-many and a many-to-one relationship between the entities. A query is entered that provides an indication of a first selected entity and a second selected entity. A preferred path is selected through the entities and relations that couples the first selected entity to the second selected entity. The preferred path is selected from a plurality of paths as a function of the number of changes in cardinality along the plurality of paths and a indicator indicative of a preferred role relating two entities.

20 Claims, 10 Drawing Sheets

TRAVERSING A RELATIONAL MODEL WITH PREFERRED PATHS

FIELD OF THE INVENTION

This invention relates in general to the field of entity relationship modeling.

BACKGROUND OF THE INVENTION

An entity relationship (ER) diagram is a graphical representation of an organization's data storage requirements. Entity relationship diagrams are abstractions of the real world which simplify a problem to be solved while retaining its essential features. Entity relationship diagrams have three different components: entities, attributes and relationships. Entities are the people, places, things, events and concepts of interest. Entities may represent collections of things, for example, an employee entity might represent a collection of all the employees that work for an organization. Individual members (employees) of the collection are called instances of the employee entity.

Entities are further described by their attributes or data elements. These are the smallest units of data that can be described in a meaningful manner. For example, an employee entity may have the following attributes: employee number, last name, first name, date of birth, telephone number, department, etc. Frequently, a meaningful relationship exists between two different types of entity. For example: employees work in a department, lawyers advise clients, equipment is allocated to projects, truck is a type of vehicle, etc.

There are potentially three types of relationships which can exist between two different entities: one-to-one, one-to-many and many-to-one relationships. A one-to-one relationship is when a single occurrence of an entity is related to just one instance of a second entity. For example, a roof covers one building; a building is covered by one roof. One-to-many relationships are when a single occurrence of an entity is related to many instances of a second entity. For example, a department has many employees. Many-to-one relationships are when many instances of an entity are related to one instance of a second entity. For example, many employees work for one department.

ER models are very flexible and by their nature it can be difficult to construct powerful calculations within them. Much of the complexity comes from the relationships. In simpler models, you only need to be concerned with attributes—for example: Sales−Cost=Profit. The power and the complexity comes when there is a desire to see something more interesting, such as sales to men for woman's apparel around Mothers Day, vs. sales to women for men's apparel around Fathers day. For this type of calculation, sales are described in terms of who bought them (men or women), when they were purchased (Mothers day or Fathers day) and the type of product (men's apparel or woman's). This requires filters on the relationship between the actual sales for a given type of product and another for the order for when it was purchased and the yet another for the customer who purchased it.

SUMMARY OF THE INVENTION

The invention contemplates systems and methods for relating entities in a data structure. The system and method determine a preferred path between two selected entities. Initially, there is provided a representation of the data structure in the form of a plurality of entities having relations between them indicative of roles and the relations reflecting a cardinality of one of a one-to-one, one-to-many and a many-to-one relationship between the entities. A query is entered that provides an indication of a first selected entity and a second selected entity.

A preferred path is selected through the entities and relations that couples the first selected entity to the second selected entity. The preferred path is selected from a plurality of paths as a function of the number of changes in cardinality along the plurality of paths and an indicator indicative of a preferred role relating two entities. A path having at least one indicator indicative of a preferred role along the path is preferred over a path having no indicator indicative of a preferred role. A path having a change in cardinality of less than two is preferred over a path having a change in cardinality of two or more.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Figure 1:
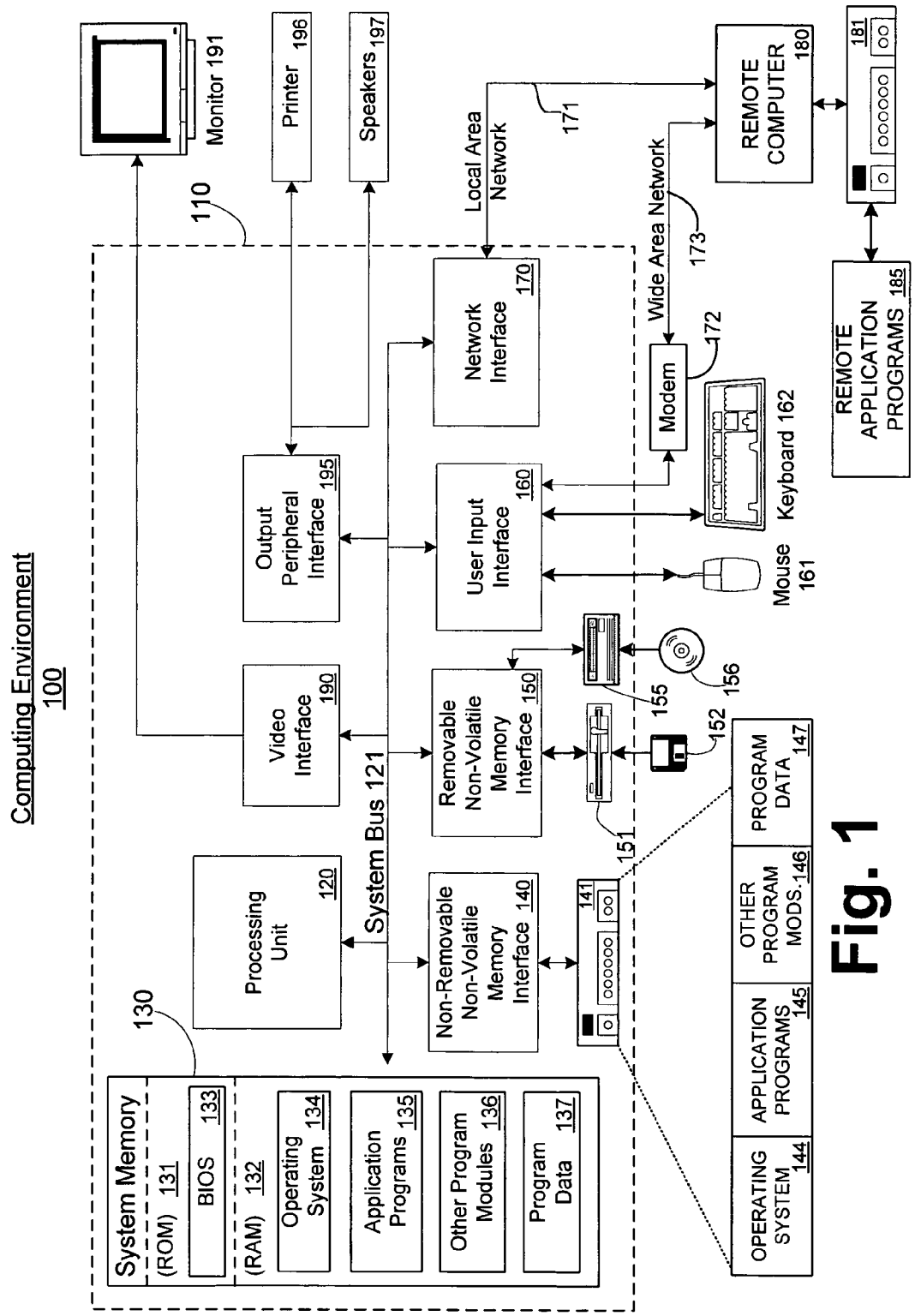
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), Peripheral Component Interconnect Express (PCI-Express), and Systems Management Bus (SMBus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The data storage medium as described with respect to FIG. 1 above may contain data structures that are accessible locally or via the network paths described. Moreover, according to an aspect of an embodiment of the invention, a user may desire to access or query the data structures.

Figure 2:
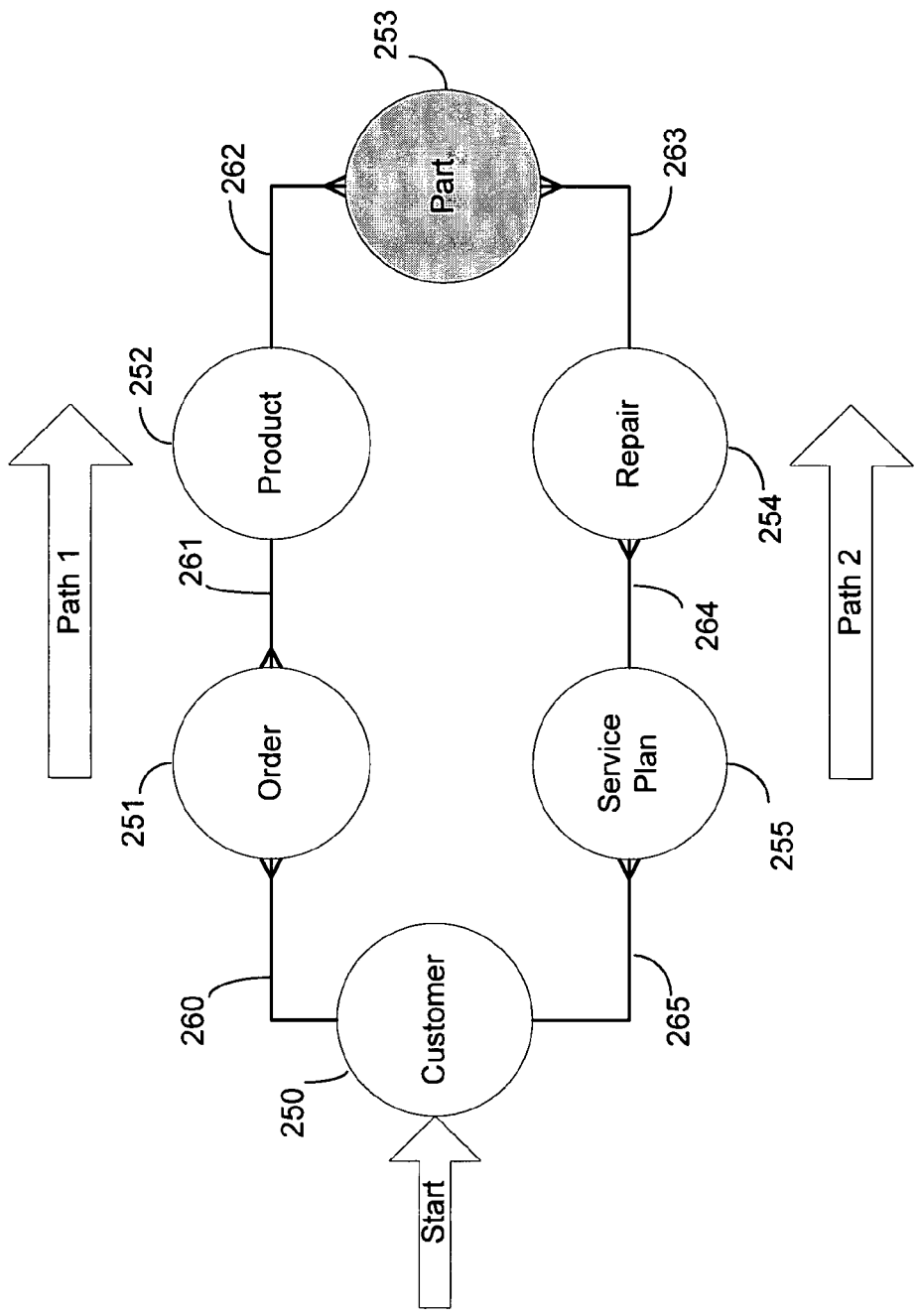
FIG. 2 illustrates an example of an entity relationship model to which an embodiment of the invention may be applied.

An entity-relationship model may be used to describe the relationships among the various entities. FIG. 2 provides an example of a fairly simple entity-relationship model. Here, the entities Customer 250, Order 251, Product 252, Part 253, Repair 254 and Service Plan 255 are related to each other according to the relations 260-265. The relations 260-265 also illustrate the cardinality of the relationship e.g., one-to-one, one-to-many, or many-to-one. For example Customers 250 is related to Orders 251 by a one-to-many relationship, i.e., for each Customer 250, there are many Orders 251. Similarly for each Customer 250 there are many Service Plans 255.

A user that wants for determine a relationship between Customer 250 and Part 253 can traverse one of two paths given the example of FIG. 2. One path would be the Customer-Order-Product-Part (Path 1). The other path would be the Customer-Service Plan-Repair-Part (Path 2). An aspect of the invention is to apply disambiguation rules to automatically determine the relationship path the user is likely to want given two entities in an entity-relationship model.

Preferably, a user would be able to use a very simple user interface (UI) to express the entities that he or she wants to relate and without the need to understand the underlying entity-relationship model, the system would determine the most likely path to relate the selected entities together.

Figure 3:
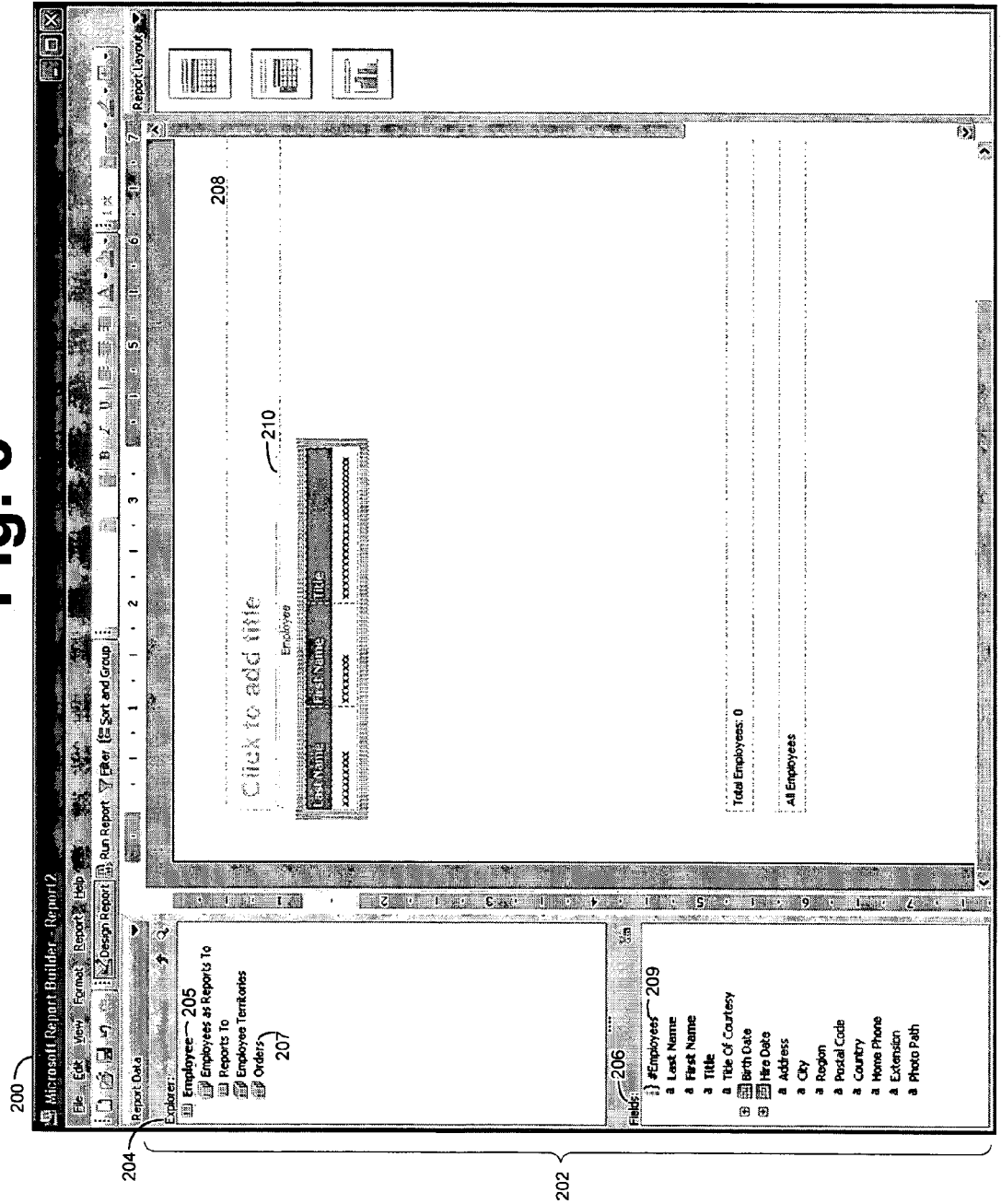
FIG. 3 illustrates an example of a user interface through which a user may interact with the data underlying the entity relationship model to invoke an aspect of an embodiment of the invention.
Figure 4:
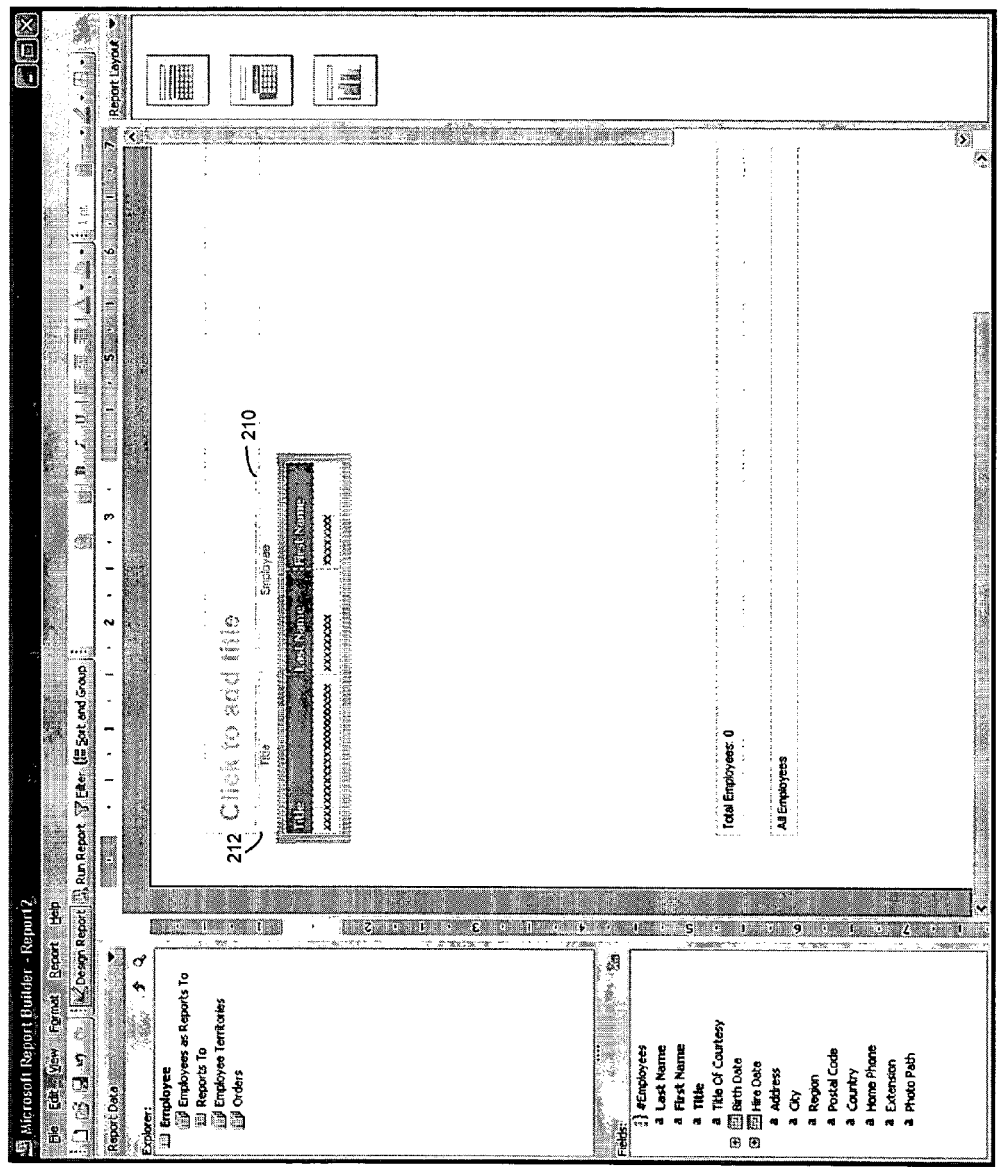
FIG. 4 further illustrates the user interface of FIG. 3.

FIGS. 3 and 4 provide an example of one such UI. FIG. 3 shows a UI 200 for building a query. The left hand Report Data panel 202 allows a user to navigate/explore the metadata available for use in building a query. The Explorer 204 shows Entities 205 and roles 207, the Fields area 206 show the list of available fields 209 for the entity. The explorer zone 204 displays all of the entities that the user has access to in the model, and once a "primary" or "base" entity has been chosen, the explorer zone 204 serves as the mechanism to traverse the model from this entity.

When an item has been selected for the query (either an entity or field), the Explorer changes from a list of all entities to reflecting the current context of the query. The entity for the first item added to the report is the base or primary entity (these terms are used interchangeably herein), i.e., the context. The Explorer 204 then shows all the roles 207 from that entity 205. Roles 207 reflect all items related to the current entity. A user can add items by dragging and dropping them from the Report Data area 202 to a design surface 208. Users can drag and drop Entities 205, Roles 207 and Fields 209 on to the design surface 208. When dragging an entity 205, the identifying attributes of the entity are added to the query. Identifying attributes are the fields 209 that identify a unique instance of the entity. For example, Employees are identified in this set of data by their Last Name and First Name, as shown on the design surface 208.

As will be understood from FIG. 4, there is an example of dragging a field onto the design surface where Title is added to the right of Last and First Name. A gray tab 210 on top of the fields indicates a group. Groupings affect the organization of the data. As shown, there is only one group: the Employee group 210. When adding a field to the right side of a group, if the group is the entity group for the field, the field is added to the entity group (as shown in FIG. 3 where Title was added to the right). If there is no entity group, a new group for the field is created.

As shown in FIG. 4, when a field is added to the left, a new group 212 for that field (i.e., Title) is created unless the field is one of the identifying attributes of the entity 205, in which case an entity group is created (or the field is added to the existing entity group). In this structure, all employees will be grouped by their title (i.e., all managers will be listed together, all vice presidents will be listed together, etc.). The exemplary query of FIG. 4 may contain as many groups as the user desires. Users have full control over the groupings in the query via the UI. Fields can be dragged and dropped to the group tabs to add an item to a group or change the "default" grouping.

Figure 5:
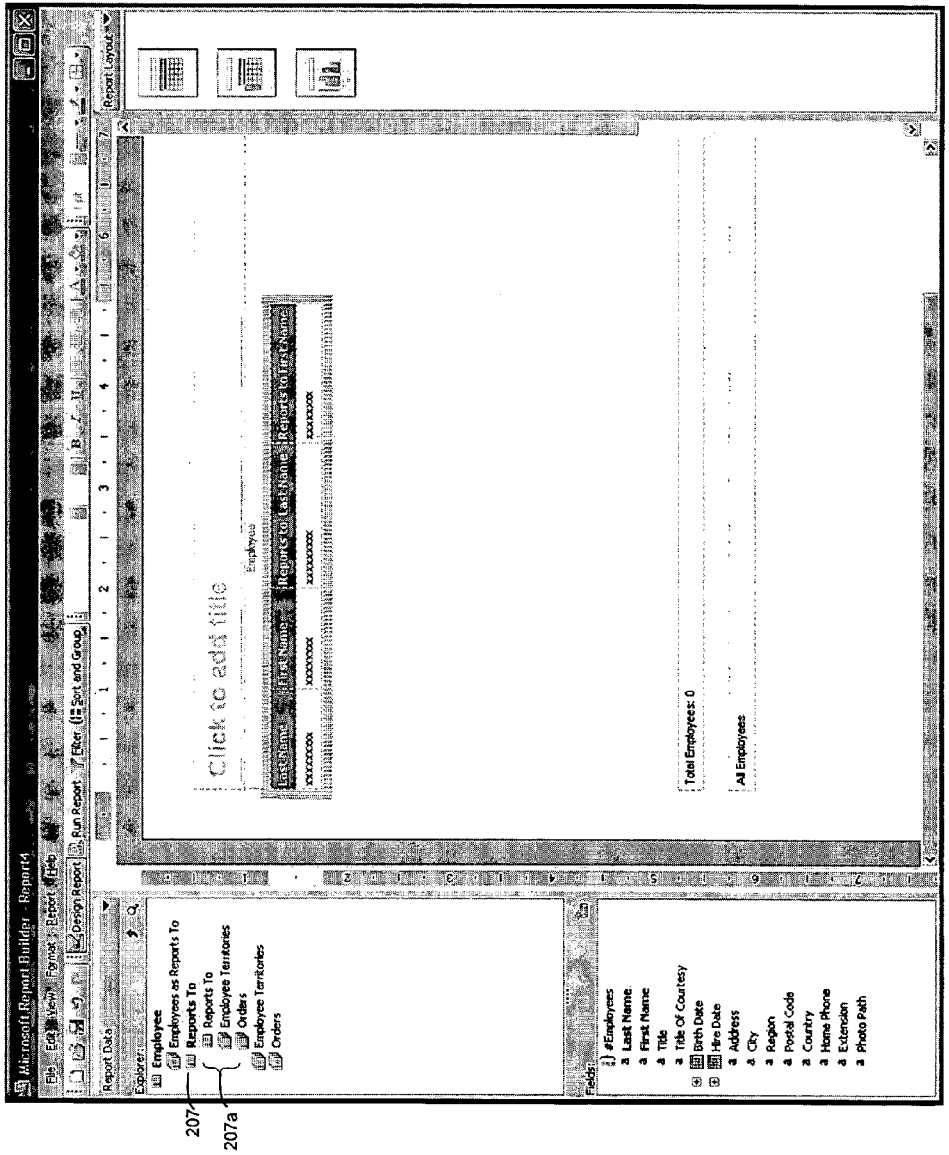
FIG. 5 further illustrates the user interface of FIGS. 3 and 4.

As shown in FIG. 5, when the user clicks on a role 207, the roles 207a associated with that role are then shown. The depth or breadth of navigation depends on the complexity of the underlying data. As long as there are relationships, users can continue to navigate through the roles 207. The card icons next to the roles 207 in the explorer indicate the cardinality of the role to its "ancestor" role. For example, "Employee" to "Reports To" is a "to one" role and "Employee" to "Orders" is a "to many" role. Employees only report to one person, but each employee may have may orders associated with them.

When scalar fields (as opposed to aggregate fields) from a related role that is "to one" from the context entity are added to the right of the existing items, the fields are added as additional details to the existing group. FIG. 5 shows adding "Reports To" identifying attributes to the Employee group.

A user can use a UI with features such as those described in FIGS. 4 and 5 to build queries where the system automatically selects the relationship between selected entities employing some of the mechanisms described herein below. For example, a user could select entities by dragging either entities or fields onto the UI surface and thereby build a query. In response, the system would determine the preferred path to join the two entites together.

Figure 6:
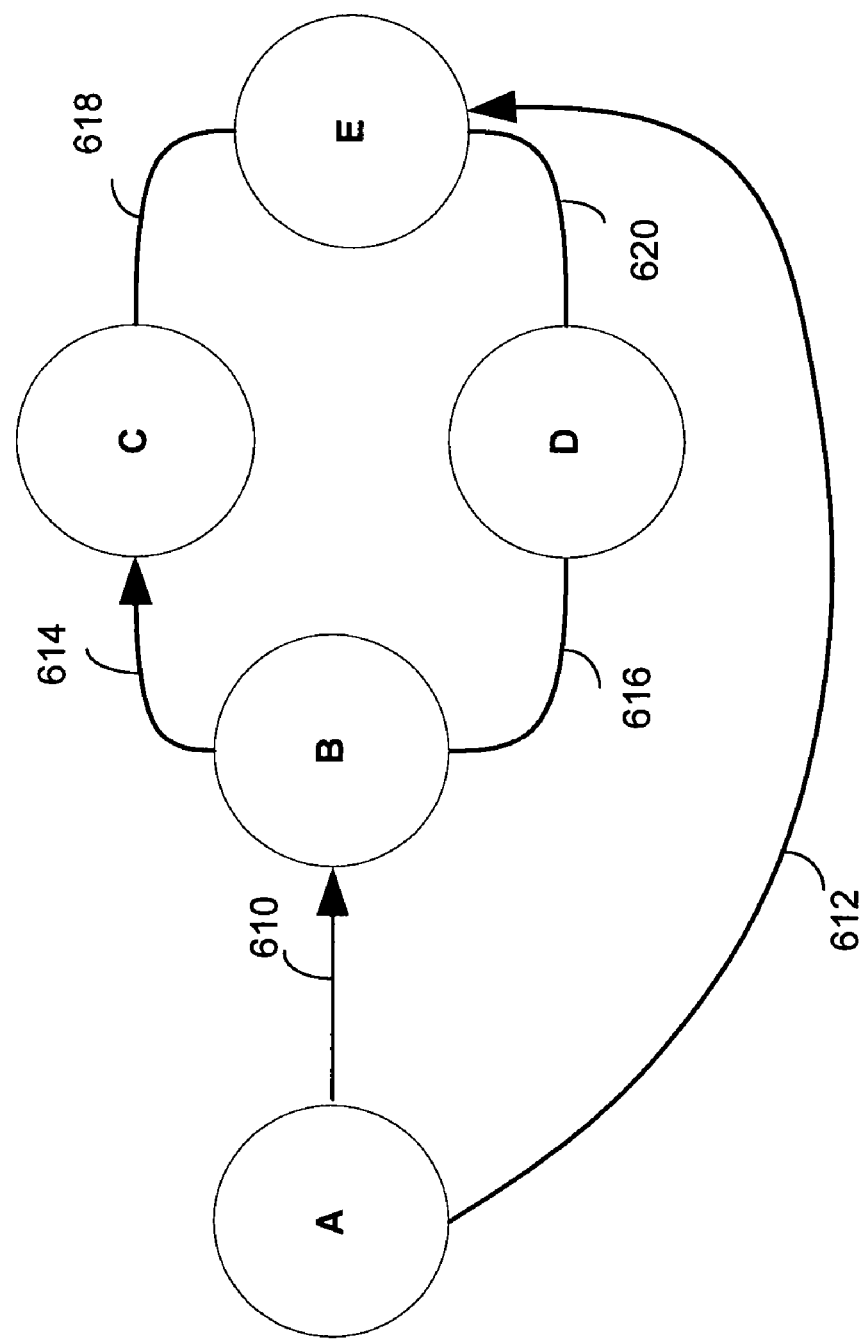
FIG. 6 illustrates an example of an entity relationship model wherein relationships along various paths have markings indicating a preferred path.

FIG. 6 provide an illustration of how an ER model can be modified in accordance with an embodiment of an aspect of the invention. Here, an indicator has been provided to the relationships between entities to indicate preferred roles. In the given example, the entity A relates to B and to E. Both of the roles 610 and 612 are marked (as indicated with the arrow) as a preferred roles. Hence, A to B is equally preferred to A to E. B in turn relates to C and to D. The role 614 from B to C is preferred over the role 616 from B to D or the role from B to A, again, as indicated by the arrow. C and D each relate to E through the respective roles 618 and 620, respectively. The example diagram does not show the cardinality of the relation as is illustrate in relations of FIG. 2 for example. However, a cardinality may also apply among the entities in FIG. 6. Although the illustration uses an arrow to indicate preferred path, an implementation may use a bit or flag setting along with a role to indicate the preference or lack of a preference.

The preferred role as illustrated in FIG. 6 can be applied by a user of the system. Most likely, the preferred role will be applied by the administrator of the model to indicate which roles a user of the model would likely preferred. In this way, an automated and systematic approach can be applied to a query in which a user wants to relate two entities, e.g., A and E, together. The automated approach would determine the various possible paths between the two selected entities and apply the rules to determine which path the user likely wants to use in the relation. The automated approach uses the rules indicated in FIG. 7.

Figure 7:
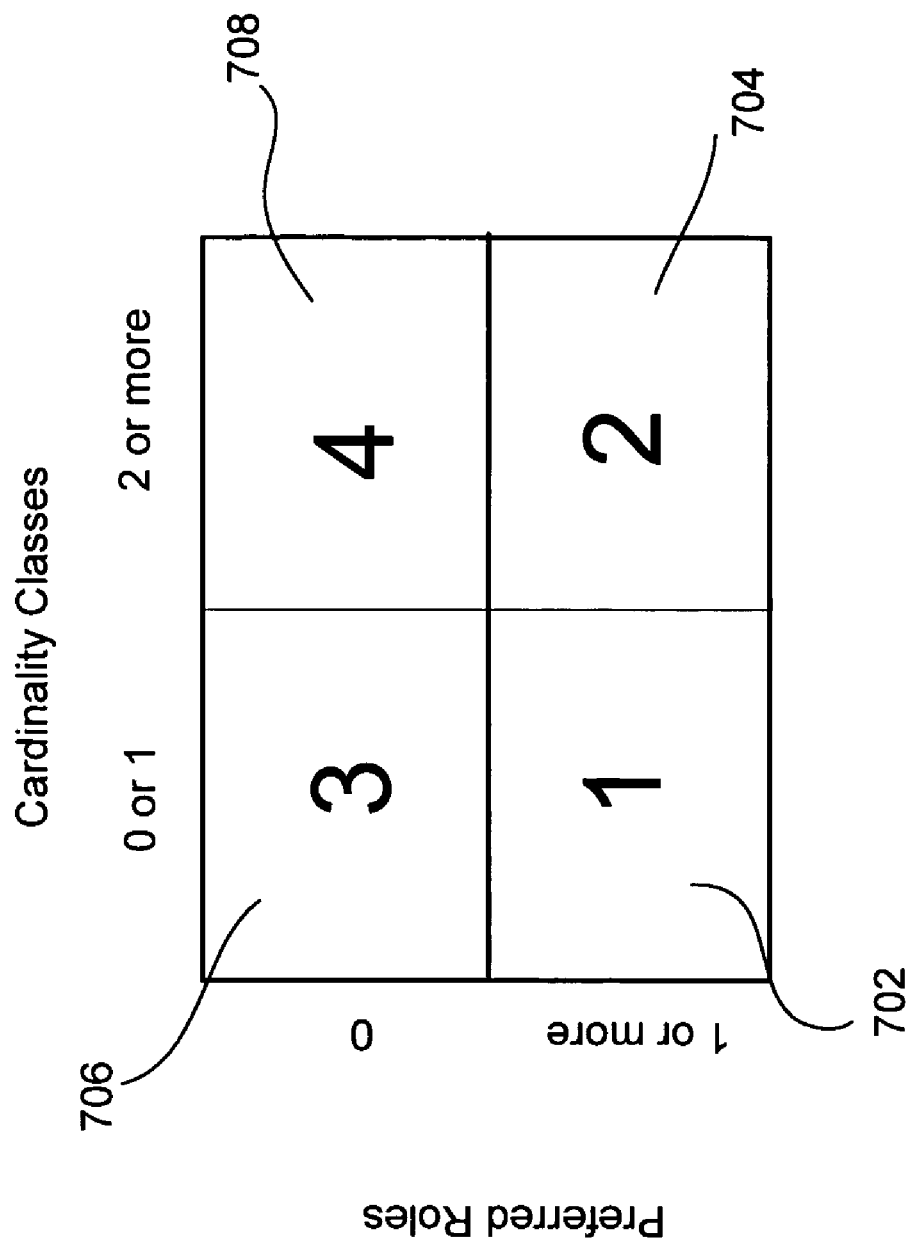
FIG. 7 illustrates the application of rules of an embodiment of aspects of the invention to rank paths between entities.

The grid as shown in FIG. 7 has the cardinality of the relationship across the abscissa and the preferred role down the ordinate an forms four buckets 702, 704, 706 and 708. There are two categories across dependent on the number of times the cardinalities of the roles along a path change as the path is traversed. The first category is where the number of changes of cardinality along the path is zero or one. The second category is where the number of changes of cardinality is two or greater. The categories down are based on the preferred roles. The first category is where there are no preferred roles along the path. The second category is where there are one or more preferred roles along the path. As indicated in the grid, paths in bucket 702 are the most preferred paths, paths in bucket 704 are the second most preferred paths, paths in bucket 706 is the third most preferred paths and paths in bucket 708 are the least preferred paths.

The rules are applied by taking each path between two entities and putting each in a bucket. After the paths are put into buckets, the most preferred paths are the paths in the most preferred bucket. If there is more than one path in a bucket, the paths in the bucket can be partially ordered by preference by applying the preferred roles rule to subpaths. When comparing any two paths in the same bucket for partial ordering, the subpaths for the two paths are determined by disregarding roles at the start and/or the end of the paths which are identical between the two paths. The remaining non-identical segments are the subpaths used for comparing the two paths. The preferred role rule is applied to each subpath to determine the most preferred path. For example, applying the algorithm to the model of FIG. 6 where a user has selected an association between entities A and E results in the following outcome (assuming that the number of cardinality changes along the paths are all zero):

| Bucket | Path | Cardinality Changes | Preferred Role |
|--------|------|---------------------|----------------|
| 1 | ABCE | 0 | 2 |
| 1 | ABDE | 0 | 1 |
| 1 | AE | 0 | 1 |

This results in all paths being in the same bucket. The rules are then recursively applied to the subpaths with the following result:

| Bucket | Path | Preferred Role |
|--------|------|----------------|
| 1 | BCE | 1 |
| 3 | BDE | 0 |

Figure 8:
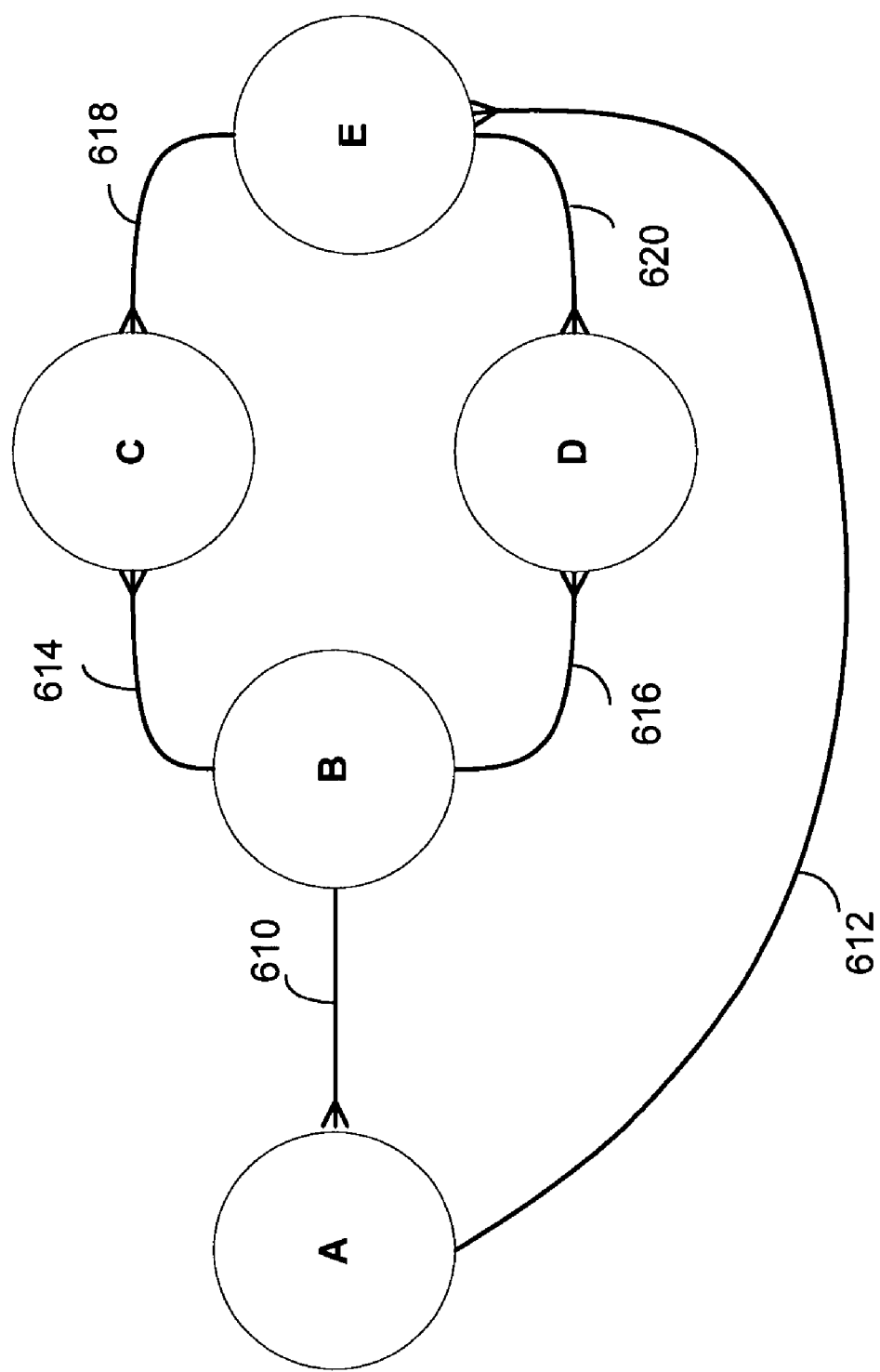
FIG. 8 illustrates changes in cardinality along paths in an entity-relationship model.

After the application of the rules to the subpaths, the path ABDE falls into a less preferred status than either of paths ABCE or AE because it contains a subpath in bucket 3. At this point, both paths ABCE and AE could be presented to the user because they are both equally preferred. The user could provide input to clarify the ambiguity. Consider how cardinality would change the outcome. FIG. 8 illustrates the same relations between entities with cardinality specified. As such the cardinality of those paths change and change the buckets for the various paths as illustrated in the table below:

| Bucket | Path | Cardinality | Preferred Role |
|--------|------|-------------|----------------|
| 1 | AE | 0 | 1 |
| 2 | ABCE | 2 | 1 |
| 2 | ABDE | 2 | 1 |

Path AE still falls into bucket 1. Now, however, paths ABCE and ABDE fall into bucket 2 because they each undergo two changes in cardinality. Accordingly, Path AE would be selected as the preferred path over both ABCE and ABDE.

Applying the algorithm to the initial example of FIG. 2 shows what initially looks like an ambiguous path from Customer to Part. The diagram shows cardinality to indicate that this path is not actually ambiguous due to step 3 of the disambiguation algorithm. The upper path (Customer-Order-Product-Part) has two changes in cardinality. The lower path (Customer-Service Plan-Repair-Part) has zero changes in cardinality and therefore results in the elimination of the upper path. Note that marking any of the roles along the upper path as preferred would result in the upper path being chosen instead.

Figure 9:
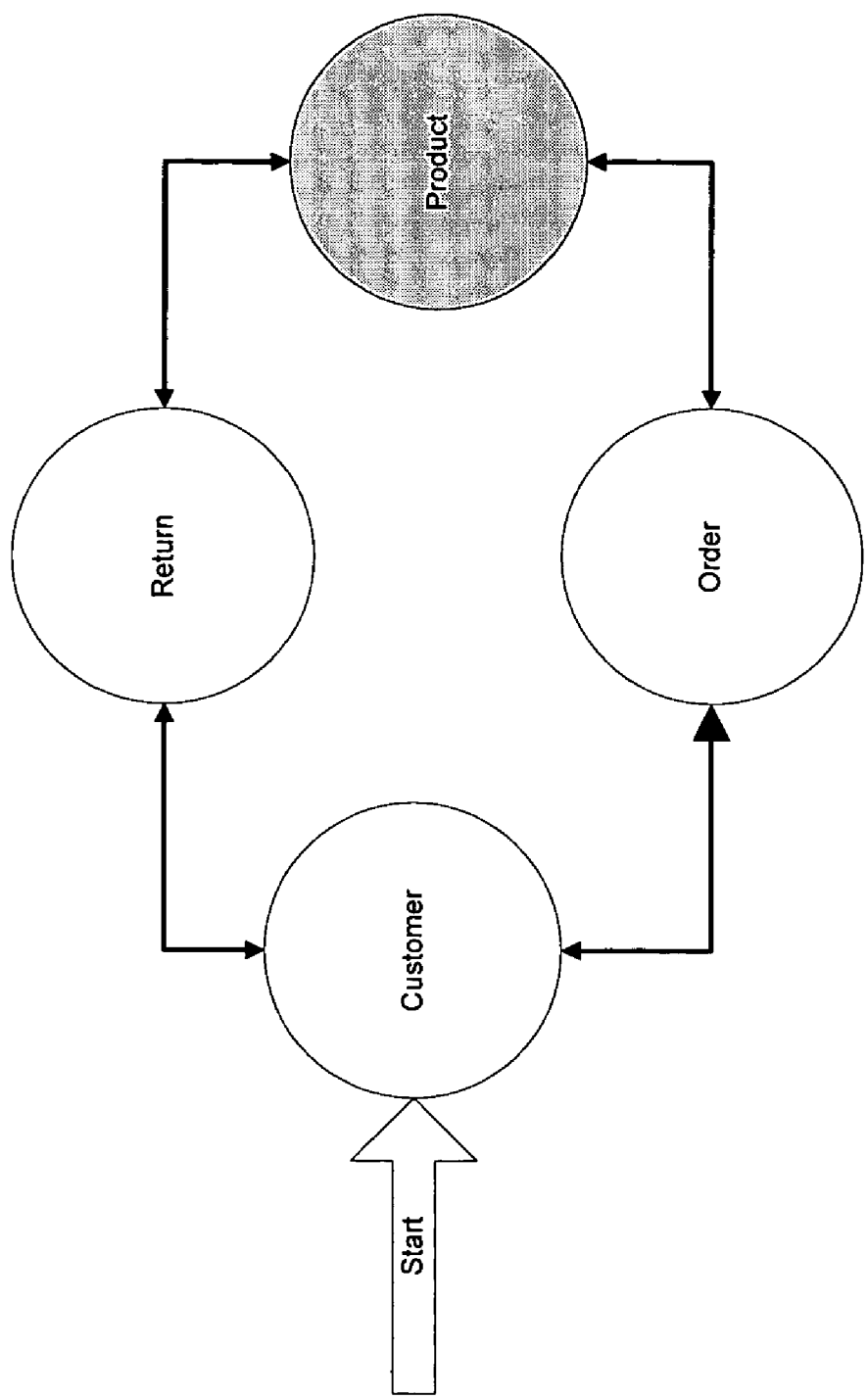
FIG. 9 illustrates an application of the rules described herein to disambiguate paths between entities in an example entity-relationship model.
Figure 10:
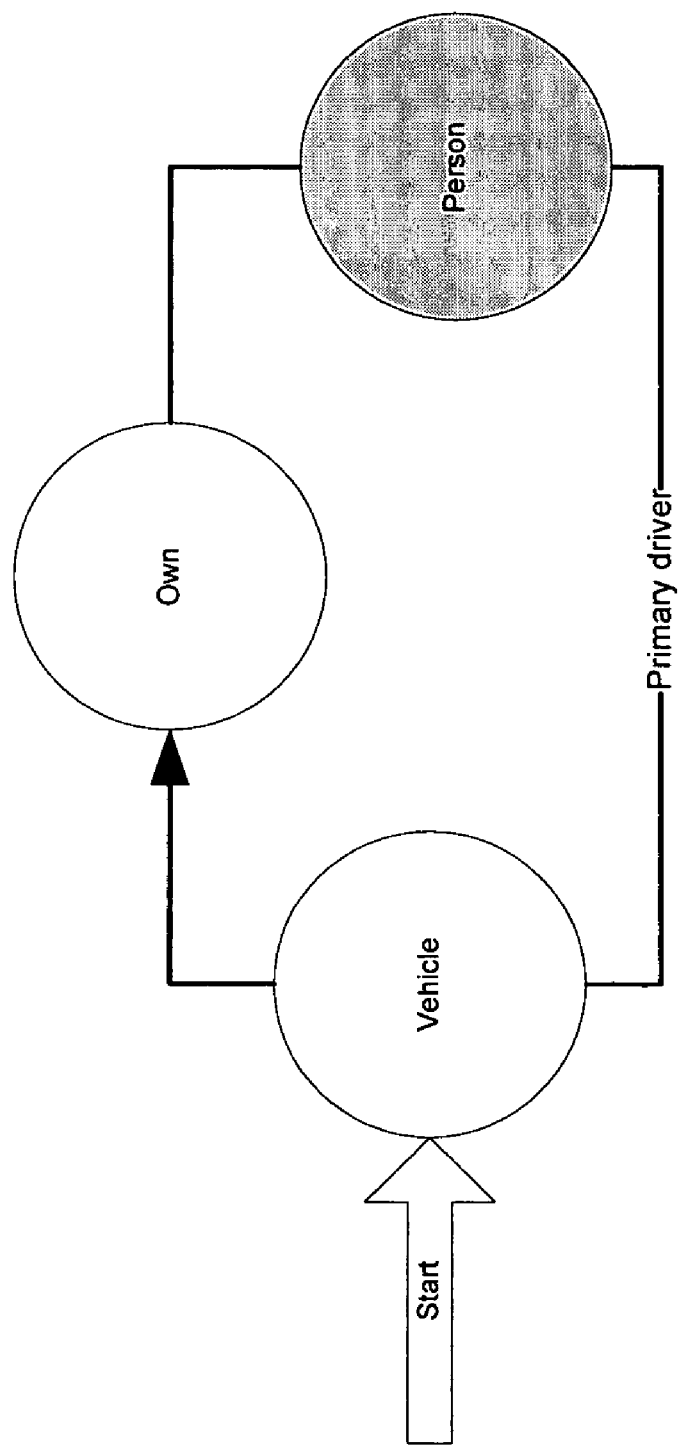
FIG. 10 illustrates an application of the rules described herein to disambiguate paths between entities in another example entity-relationship model.

FIGS. 9 and 10 provide two additional examples of the application of the rules. FIG. 9 shows an ambiguous path from Customer to Product. Marking the Customer-Order role as preferred disambiguates the path, resulting in a preferred path of: Customer-Order-Product. FIG. 10 shows an ambiguous path from Vehicle to Person. Note that it is ambiguous even though the Vehicle-Person path is shorter than the Vehicle-Own-Person path. Marking Vehicle-Own as preferred disambiguates the path, resulting in a preferred path of: Vehicle-Own-Person.

Program code to apply the rules could be based on following actions:
1. Calculate all valid paths to the target entity
   A. Start from the base entity for the query.
   B. Any role from the current entity or any of its ancestors is a valid step in the path.
   C. Never loop back (i.e. a valid path never revisits an entity or any of its ancestors in the inheritance tree).
2. Remove non-preferred paths
   A. Sort paths by percent of preferred roles (for performance).
   B. For each path (P), compare to all other paths (O).
   C. Compare only the non-identical parts of P (P') and O (O').
   D. If P' contains no preferred roles and O' contains at least one preferred role, remove P.
3. Prune paths based on cardinality direction changes
   A. For each path, count the number of times adjacent roles have differing cardinality (ignoring optionality and skipping over one-to-one relationships).

B. If at least one path has zero or one cardinality changes, remove all paths with more than one cardinality direction changes.

4. Prompt the user for path selection if more than one path remains.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer-based method comprising:
   storing a representation of a data structure in a form of a plurality of entities having relations between said plurality of entities indicative of roles and; wherein the relations have a cardinality of one of a one of a one-to-one, one-to-many and a many-to-one relationship between the entities;
   receiving an indication of a query relating a first selected entity to a second selected entity;
   calculating a plurality of valid paths between the first selected entity and the second selected entity;
   determining a preferred path through the entities and relations that couples the first selected entity to the second selected entity;
   the preferred path determined from the plurality of valid paths as a function of the number of changes in cardinality between successive pairs of entities along the plurality of paths and an indicator indicative of preferred roles relating two successive entities; and
   providing an indicator to a user that one of the plurality of valid paths is the preferred path.

2. The method as recited in claim 1 wherein a path having at least one indicator indicative of a preferred role along the path is preferred over a path having no indicator indicative of a preferred role.

3. The method as recited in claim 2 wherein a path having a number of changes in cardinality direction of less than two is preferred over a path having a number of changes in cardinality direction of two or more.

4. The method as recited in claim 3 wherein a plurality of paths may have non-identical subpaths and wherein paths containing a subpath having at least one indicator indicative of a preferred role along the subpath are preferred over paths containing a subpath having no indicator indicative of a preferred role.

5. The method as recited in claim 1 wherein the data structure is a database.

6. The method as recited in claim 1 wherein a users selects two entities to relate and wherein a preferred path is automatically selected.

7. The method as recited in claim 1 wherein the step of finding a preferred path further comprises calculating all valid paths between the entities and removing non-preferred paths from consideration based on at least one path having a preferred role and at least one other path having no preferred roles.

8. A computer-readable medium bearing computer-readable instructions fixed thereon for carrying out the acts comprising:
   receiving a representation of a data structure in the form of a plurality of representations of entities having relations between them indicative of roles and wherein the representation comprises an indication of the cardinality of a relationship between entities wherein the cardinality comprises one of a one of a one-to-one, one-to-many and a many-to-one relationship between the entities;
   receiving input indicative of a preferred roles relating two successive entities;
   receiving an indication of a query relating a first selected entity to a second selected entity;
   calculating a plurality of valid paths between the first selected entity and the second selected entity;
   determining a preferred path through the entities and relations that couples the first selected entity to the second selected entity as a function of the indicator indicative of preferred roles relating two entities; and
   providing an indicator to a user that one of the plurality of valid paths is the preferred path.

9. The computer-readable medium bearing computer-readable instructions as recited in claim 8 wherein the step of finding a preferred path through the entities and relations that couples the first entity to the second selected entity further comprises selecting from a plurality of paths as a function of the number of changes in cardinality along the plurality of paths.

10. The computer-readable medium bearing computer-readable instructions as recited in claim 9 wherein the changes in cardinality represents a change along a path from a one-to-many to a many-to-one relationship between the entities.

11. The computer-readable medium bearing computer-readable instructions as recited in claim 10 wherein a path having a number of changes in cardinality direction of less than two is preferred over a path having a number of changes in cardinality direction of two or more.

12. The computer-readable medium bearing computer-readable instructions as recited in claim 9 wherein the changes in cardinality represents a change along a path from a many-to-one to a one-to-many relationship between the entities.

13. computer-readable medium bearing computer-readable instructions as recited in claim 8 wherein a path having at least one indicator indicative of a preferred role along the path is preferred over a path having no indicator indicative of a preferred role.

14. The computer-readable medium bearing computer-readable instructions as recited in claim 13 wherein a plurality of paths may have non-identical subpaths and wherein paths containing a subpath having at least one indicator indicative of a preferred role along the subpath are preferred over paths containing a subpath having no indicator indicative of a preferred role.

15. A computer-readable medium bearing computer-readable instructions fixed thereon for carrying out the acts comprising:
   receiving a representation of a data structure in the form of a plurality of representations of entities having relations between them indicative of roles and wherein the representation comprises an indication of the cardinality of a relationship between successive entities wherein the cardinality is one of a one of a one-to-one, one-to-many and a many-to-one relationship between the entities;

receiving input indicative of a preferred roles relating two successive entities;

receiving an indication of a query relating a first selected entity to a second selected entity;

calculating a plurality of valid paths between the first selected entity and the second selected entity;

determining a preferred path through the entities and relations that couples the first selected entity to the second selected entity as a function of a change in cardinality between successive pairs of entities along the plurality of paths relating two entities; and providing an indicator to a user that one of the plurality of valid paths is the preferred path.

16. The computer-readable medium bearing computer-readable instructions as recited in claim 15 further comprising finding a preferred path through the entities and relations that couples the first selected entity to the second selected entity as a function of the indicator indicative of preferred roles relating two entities.

17. The computer-readable medium bearing computer-readable instructions as recited in claim 16 wherein a path having at least one indicator indicative of a preferred role along the path is preferred over a path having no indicator indicative of a preferred role.

18. The computer-readable medium bearing computer-readable instructions as recited in claim 15 wherein the changes in cardinality represents a change along a path from a one-to-many to a many-to-one relationship between the entities.

19. The computer-readable medium bearing computer-readable instructions as recited in claim 15 wherein the changes in cardinality represents a change along a path from a many-to-one to a one-to-many relationship between the entities.

20. The computer-readable medium bearing computer-readable instructions as recited in claim 15 wherein a path having a number of changes in cardinality direction of less than two is preferred over a path having a number of changes in cardinality direction of two or more.

* * * * *